2,784,059

ANHYDROUS CUPRIC FLUORIDE

David A. McCaulay, Chicago, Ill., assignor to Standard Oil Company, Chicago, Ill., a corporation of Indiana No Drawing. Application March 21, 1956,
Serial No. 572,790

8 Claims. (Cl. 23—88)

This invention relates to anhydrous cupric fluoride. More particularly, to the preparation of anhydrous cupric fluoride from cupric fluoride hydrate.

Anhydrous cupric fluoride is of value in combination with liquid HF for the separation of aromatic hydrocarbons from non-aromatic hydrocarbons.

An object of the invention is anhydrous cupric fluoride. Another object is a method for preparing anhydrous cupric fluoride from cupric fluoride hydrate, particularly cupric fluoride dihydrate. Other objects will become apparent in the course of the detailed description of the invention.

It has been found that anhydrous cupric fluoride ($CuF_2$) can be prepared from cupric fluoride hydrate, such as the dihydrate $CuF_2.2H_2O$, by a reaction involving liquid hydrogen fluoride, boron trifluoride and an aromatic hydrocarbon wherein the HF and $BF_3$ are distilled away from the reaction product mixture. All of the water of hydration is removed along with the HF and $BF_3$, leaving in the reaction zone anhydrous cupric fluoride and aromatic hydrocarbon. It is possible to filter away the anhydrous cupric fluoride from the aromatic hydrocarbon or distill away the aromatic hydrocarbon simultaneously with the HF and $BF_3$.

Anhydrous cupric fluoride ($CuF_2$) is neither available commercially nor does the literature carry any method for the production thereof. Commercially, cupric fluoride is available only in the form of a hydrate; normally the article of commerce is the cupric fluoride dihydrate ($CuF_2.2H_2O$). The cupric fluoride hydrate is dehydrated by the method of the invention to a brown solid which is the anhydrous cupric fluoride.

The method involves 2 major steps. In the first step, the cupric fluoride hydrate is contacted with liquid hydrogen fluoride, boron trifluoride and an aromatic hydrocarbon. It is theorized that the water of hydration reacts with HF to form a stable hydrate and the cupric fluoride reacts with $BF_3$ and aromatic hydrocarbon to form a complex. In the second step, the reaction mixture is heated and maintained at a temperature and pressure such that at least the HF and $BF_3$ are distilled away from the reaction zone, leaving behind anhydrous cupric fluoride and aromatic hydrocarbon. It is theorized that the HF hydrate is removed simultaneously with the excess HF and the $BF_3$ from the decomposition of the cupric fluoroborate-aromatic complex.

It is necessary that water, except for that present in the hydrate, be at a minimum in the system. Thus, the method is carried out under essentially anhydrous conditions. The hydrogen fluoride used in the method should be either anhydrous HF or essentially anhydrous HF. The commercial grade of anhydrous hydrofluoric acid which contains from 1 to 2% of water is suitable for use in the method. If necessary, the aromatic hydrocarbon should be freed of dissolved water prior to use in the method.

The hydrogen fluoride is present in the reaction vessel in an amount of at least about 3 moles per mole of cupric fluoride hydrate. More than this amount may be used, for example, as much as 30 moles. It is preferred to utilize between about 10 and 15 moles of HF per mole of cupric fluoride hydrate.

Boron trifluoride is present in the reaction zone in an amount of at least about 1 mole per mole of cupric fluoride hydrate. To insure maximum conversion of the cupric fluoride hydrate, at least 1 mole of $BF_3$ is used per mole of said hydrate. More than this amount of $BF_3$ may be used although there does not appear to be any significant beneficial result. Commercial grade cylinder $BF_3$ is suitable for use in the method.

The presence of an aromatic hydrocarbon in the reaction zone is essential to the dehydration effectiveness of the method. It is believed that a complex consisting of cupric fluoroborate and aromatic hydrocarbon is formed, which complex is dissolved by liquid HF. The complex is believed to contain 1 mole of aromatic hydrocarbon per mole of cupric fluoride as well as some hydrogen fluoride. The aromatic hydrocarbon may be a benzene hydrocarbon or a polycyclic hydrocarbon containing at least one benzene ring. For example, the aromatic hydrocarbons may be benzene hydrocarbons such as benzene, toluene, ethylbenzene, a xylene isomer, a trimethylbenzene isomer, a tetramethylbenzene isomer, pentamethylbenzene, hexamethylbenzene, ethylbenzene or any one of the ethylbenzenes corresponding to the above methylbenzenes. Benzene hydrocarbons containing substituents such as propyl groups, butyl groups or pentyl groups, etc. may also be used.

The naphthalene hydrocarbons, such as naphthalene, ethylnaphthalene, methylnaphthalene, isopropylnaphthalene, etc. may be utilized. Aromatic hydrocarbons of the anthracene series may be utilized. The hydronaphthalenes, such as tetralin, may be used in the process. The various indane derivatives may also be used in the reaction.

The benzene hydrocarbons selected from the class consisting of benzene, toluene, ethylbenzene and xylene or mixtures thereof are particularly suitable. It is preferred to utilize toluene.

In general, it is desirable to use at least about 1 mole of aromatic hydrocarbon per mole of cupric fluoride hydrate. When maximum yield of anhydrous cupric fluoride is desired, at least 1 mole of aromatic hydrocarbon should be used. It is preferred to use about 2 moles of aromatic hydrocarbon per mole of cupric fluoride hydrate.

The initial reaction occurs very rapidly at temperatures over the range of about —40° C. and higher. Temperatures as high as 200° C. may be used. The upper temperature, in general, is limited by the type of aromatic hydrocarbon used. At elevated temperatures, many aromatic hydrocarbons are cracked by liquid HF with attendant tar and gas formation. However, the reaction takes place so rapidly and smoothly with the absence of side effects at ambient temperatures that it is preferred to operate within the range of about 20° C. to 35° C. It is to be understood that the initial reaction step requires the presence of liquid HF and, therefore, sufficient pressure must be maintained on the reaction zone to keep the HF in the liquid state. The reaction is a rapid one and at the preferred temperatures, times as short as 5 minutes or less may be sufficient and times as long as 60 minutes may be utilized. Since the reaction involves one solid phase, the reaction time is mainly dependent upon the degree of agitation imparted to the reaction zone.

The anhydrous cupric fluoride is obtained by distilling HF and $BF_3$ from the reaction zone after the initial reaction has taken place. The HF, $BF_3$ and water of hydration are removed by maintaining the reaction mixture at a temperature between about 100° C. and 200° C., at a pressure sufficient to enable the HF to be distilled away from the reaction material. In general, at 100° C. it will be desirable to operate with a vacuum on the order of 1 to 5 mm. Hg in order to obtain a reasonable time of distillation. At the higher temperatures, it may be desirable to operate at superatmospheric pressure when it is desired to recover the HF in the form of a liquid.

The distillation may be so conducted to remove the HF, $BF_3$, water and some of the aromatic hydrocarbons or even all the aromatic hydrocarbon overhead. If all of the aromatic hydrocarbon is not distilled, the anhydrous cupric fluoride solid may be readily filtered away from the remaining aromatic hydrocarbon. In general, satisfactory recovery of anhydrous cupric fluoride is obtained by operating at a temperature between about 100° C. and 125° C. utilizing vacuum such as is obtained by ordinary laboratory vacuum pumps, i. e., 1–10 mm. Hg.

The anhydrous cupric fluoride prepared by the method of the invention is a brownish crystalline solid.

The preparation of anhydrous cupric fluoride by the method of the invention and attempted preparations by other methods is illustrated by the following tests. In all of these tests, the materials were placed in a Hastelloy autoclave provided with a mechanical stirrer and a pressure gauge and means for controlling the temperature within the autoclave. It was possible to measure the amount of HF, $BF_3$ and aromatic hydrocarbon withdrawn from the autoclave during the $CuF_2$ recovery procedure.

Test 1

In this test, commercial grade cupric fluoride dihydrate, which material is a blue crystalline solid, was charged to the reactor in an amount of 38 grams. Commercial grade anhydrous hydrofluoric acid containing about 99% of HF was charged in an amount of 500 grams. The reactor was then heated to 200° C. and maintained at that temperature for 5 hours while the HF was gradually bled from the reactor. When all the HF had been removed, the reactor was opened. All the solid charged was recovered in the form of the blue crystalline material. No appreciable amount of the hydrate had been converted.

Test 2

In this test, 38 grams of cupric fluoride dihydrate and 60 grams of anhydrous hydrofluoric acid were charged to the reactor. Toluene and n-heptane, 62 ml. each, were charged to the reactor. The reactor was agitated for one hour at 25° C. The HF and hydrocarbons were distilled from the reactor zone and the cupric fluoride dihydrate recovered unchanged.

Test 3

In this test, 38 grams (.28 mole) of cupric fluoride dihydrate, and 60 grams (3 moles) of anhydrous hydrofluoric acid were changed to the reactor. $BF_3$ in an amount of 18 grams (.27 mole) was charged to the reactor. Toluene and n-heptane in an amount of 117 ml. were also added to the reactor. The toluene amounted to 0.55 mole. The contents of the reactor were agitated for one hour at 25° C. The initial pressure in the reactor dropped very rapidly, indicating complex formation. At the end of one hour, the reactor was raised to a temperature of 110° C. and a vacuum of 1–2 mm. Hg applied to the reactor. Vacuum pumping continued for 3 hours. At the end of this time, all the $BF_3$ charged had been recovered as such, along with the toluene and n-heptane. It appeared that not only HF, but HF-hydrate had been taken overhead. At the end of this time, the reactor was opened and a brownish solid was recovered therefrom corresponding to a theoretical yield of anhydrous cupric fluoride.

Prior to application of the vacuum on the reactor, a portion of the lower liquid phase present in the reactor was withdrawn. This phase was decomposed with cold water, forming an upper hydrocarbon layer and a lower aqueous layer. The hydrocarbon layer was analyzed to contain 96% of toluene.

A sample of the upper layer present in the reactor was also taken and was found to contain 17% of aromatic hydrocarbon and the remainder n-heptane.

Thus having described the invention, what is claimed is:

1. A method for preparing anhydrous cupric fluoride, which method comprises contacting cupric fluoride hydrate, at least about 1 mole of $BF_3$ per mole of said hydrate, at least about 3 moles of liquid HF per mole of said hydrate and at least about 1 mole of aromatic hydrogen per mole of said hydrate, under essentially anhydrous conditions, at a temperature between about $-40°$ C. and 200° C. and a pressure at least sufficient to maintain said HF in the liquid state, maintaining the contents of the reaction zone at a temperature between about 100° C. and 200° C. and a pressure such that all the HF and $BF_3$ are distilled from the reaction zone and recovering anhydrous cupric fluoride therefrom.

2. The method of claim 1 wherein said aromatic hydrocarbon is selected from the class consisting of benzene, toluene, ethylbenzene and xylene.

3. A method for preparing anhydrous cupric fluoride which comprises contacting cupric fluoride hydrate, at least 1 mole of $BF_3$ per mole of said hydrate, at least 1 mole of aromatic hydrocarbon per mole of said hydrate, between 3 and 30 moles of liquid HF per mole of said hydrate, under essentially anhydrous conditions, at a temperature between about 20° and 35° C. and a pressure at least sufficient to maintain said HF in the liquid state, for a time between about 5 minutes and 60 minutes, maintaining the reaction mixture at a temperature between about 100° and 125° C. and a pressure such that HF and $BF_3$ are distilled away from the reaction zone and recovering anhydrous cupric fluoride therefrom.

4. The method of claim 3 wherein said distillation is continued until all the aromatic hydrocarbon has been distilled from said reaction zone, leaving solid anhydrous cupric fluoride therein.

5. The method of claim 3 wherein the HF is present in an amount between about 10 and 15 moles per mole of said hydrate.

6. The method of claim 3 wherein said aromatic hydrocarbon is selected from the class consisting of benzene, toluene, ethylbenzene and xylene.

7. The method of claim 3 wherein said aromatic hydrocarbon is toluene.

8. The method of claim 3 wherein said aromatic hydrocarbon is present in an amount of about 2 moles per mole of said hydrate.

No references cited.